United States Patent

Soma et al.

(10) Patent No.: US 8,315,647 B2
(45) Date of Patent: Nov. 20, 2012

(54) TIME AND POWER BASED WIRELESS LOCATION DETECTION SYSTEM

(75) Inventors: Pitchaiah Soma, Downington, PA (US); Jeffrey F. Bull, Chalfont, PA (US); Rashidus S. Mia, Phoenixville, PA (US); Pete A. Boyer, Chesterbrook, PA (US)

(73) Assignee: TruePosition, Inc., Berwyn, PA (US)

( * ) Notice: Subject to any disclaimer, the term of this patent is extended or adjusted under 35 U.S.C. 154(b) by 125 days.

(21) Appl. No.: 12/980,116

(22) Filed: Dec. 28, 2010

(65) Prior Publication Data

US 2012/0165038 A1    Jun. 28, 2012

(51) Int. Cl.
 *H04W 24/00* (2009.01)
(52) U.S. Cl. ............ 455/456.1; 455/422.1; 455/456.5; 455/456.6
(58) Field of Classification Search .................. None
 See application file for complete search history.

(56) References Cited

U.S. PATENT DOCUMENTS

| | | | |
|---|---|---|---|
| 6,782,264 B2 | 8/2004 | Anderson | |
| 6,950,664 B2 * | 9/2005 | Chen et al. | 455/456.5 |
| 7,072,666 B1 | 7/2006 | Kullman et al. | |
| 7,486,233 B2 | 2/2009 | Stenberg et al. | |
| 7,783,299 B2 | 8/2010 | Anderson et al. | |
| 2003/0139188 A1 * | 7/2003 | Chen et al. | 455/456 |
| 2006/0267840 A1 | 11/2006 | Stenberg et al. | |
| 2007/0232327 A1 | 10/2007 | Laroia et al. | |
| 2007/0254673 A1 * | 11/2007 | Stenberg et al. | 455/456.1 |
| 2008/0130480 A1 | 6/2008 | Li et al. | |
| 2008/0214205 A1 | 9/2008 | Alles et al. | |
| 2009/0131073 A1 | 5/2009 | Carlson et al. | |
| 2010/0120447 A1 | 5/2010 | Anderson et al. | |

OTHER PUBLICATIONS $3^{rd}$ Generation Partnership Project (3GPP), TS 04.08, V7.21.0, $3^{rd}$ Generation Partnership Project; Technical Specification Group Core Network; "Mobile radio interace layer 3 specification" (Release 1998), Dec. 2003, 623 pages.
$3^{rd}$ Generation Partnership Project (3GPP), TS 05.08, V8.23.0, 3 rd Generation Partnership Project; Technical Specification Group GSM/EDGE Radio Access Network; "Radio subsystem link control", (Release 1999), section 3, Nov. 2005, 100 pages.
$3^{rd}$ Generation Partnership Project (3GPP), TS 31.111, V9.6.0, $3^{rd}$ Generation Partnership Project; Technical Specification Group Core Network and Terminals; Universal Subscriber Identity Module (USIM) Application Toolkit (USAT), (Release 9), Jun. 2011, 109 pages.

(Continued)

*Primary Examiner* — Rafael Pérez-Gutiérrez
*Assistant Examiner* — Suhail Khan
(74) *Attorney, Agent, or Firm* — Woodcock Washburn LLP

(57) ABSTRACT

Disclosed is a method for processing readily available radio network, timing and power information about cellular networks and typical measurements made by the mobile device and network. A probabilistic method is disclosed that uses both time (i.e., range) and power differences with known downlink transmitter antenna characteristics to locate mobiles with accuracy better than cell-ID with ranging, with high capacity, and without the need for field calibration.

60 Claims, 10 Drawing Sheets

OTHER PUBLICATIONS

3$^{rd}$ Generation Partnership Project (3GPP), TS 36.305, V9.3.0, 3$^{rd}$ Generation Partnership Project; Technical Specification Group Radio Access Network; Evolved Universal Terrestrial Radio Access Network (E-UTRAN); "Stage functional specification of User Equipment (UE) positioning in E-UTRAN", (Release 9), section 4.3.3, Jun. 2010, 52 pages.

U.S. Appl. No. 11/736,950, filed Apr. 18, 2007, Mia et al.

3$^{rd}$ Generation Partnership Project (3GPP), TS 43.059, V9.0.0, 3$^{rd}$ Generation Partnership Project; Technical Specification Group GSM/EDGE Radio Access Network; "Functional stage 2 description of Location Services (LCS) in GERAN", (Release 9), section 4.2.1, Nov. 2009, 69 pages.

3$^{rd}$ Generation Partnership Project (3GPP) TS 11.14, V8.18.0, 3$^{rd}$ Generation Partnership Project; "Specification of the SIM Application Toolkit (SAT) for the Subscriber Identity Module—Mobile Equipment (SIM-ME) interface", (Release 1999), Jun. 2007, 157 pages.

International Patent Application No. PCT/US11/064032: International Search Report and Written Opinion dated Feb. 29, 2012, 13 pages.

\* cited by examiner

TIME AND POWER BASED WIRELESS LOCATION DETECTION SYSTEM

TECHNICAL FIELD

The present invention relates generally to methods and apparatus for locating wireless devices, also called mobile stations (MS), such as those used in analog or digital cellular systems, personal communications systems (PCS), enhanced specialized mobile radios (ESMRs), and other types of wireless communications systems. More particularly, but not exclusively, the present invention relates to the position of mobile devices using pre-existing wireless infrastructure data.

BACKGROUND

A wireless communications network (WCN) manages mobility of a wireless mobile device by collecting radio information about the network. From the advent of location-based services, this radio information has been used to provide low and medium accuracy location estimates.

In non-softhandoff systems, the location of every active mobile in the network is known to the nearest serving cell and sector. The identification of the serving cell and serving sector can be converted to a location estimate by simple translation to a pre-established latitude and longitude for the serving cell and/or sector.

Inclusion of the time or power-based range from the serving cell used by the WCN to maintain a radio link to the serving cell provides a method for refining the basic serving cell location with minimal calculation.

A further refinement of the cell/sector+ranging method using the mobile-collected network information is generally known as Enhanced Cell-ID (ECID). The ECID technique relies on the mobile unit's ability to record the power levels from the beacons (also known as pilots) of multiple potential handover candidate/neighbor cells. This technique adds a power-difference-of-arrival (PDOA) measurement to improve the serving cell ranging location estimate.

Since typically the signal power between the serving cell and the active mobile device is known by the WCN, the PDOA for ECID value is based on the received signal levels collected by the mobile for the serving cell's and at least three neighboring cell's beacons. Since the PDOA data collection requires visibility to two or more neighbor cell sites, location yield will be less than 100%. The effects of RF multipath, mobile receiver quality, and granularity of the measurement all act to reduce location accuracy for ECID.

ECID in GSM and LTE

In GSM, ECID is also known as Network Measurement Report (NMR) location. The NMR is generated by the mobile to provide the WCN with information regarding the serving and neighboring cells to facilitate handover as described in GSM/3GPP Technical Standard 05.08, *"Radio subsystem link control"* section 3 (Handover).

The Enhanced Cell ID positioning technique is standardized as "Timing Advance" positioning in 3GPP TS 43.059, *"Functional stage 2 description of Location Services (LCS) in GERAN"* section, section 4.2.1. In LTE networks the "enhanced cell ID method" is described in 3GPP TS 36.305, *"Stage 2 functional specification of User Equipment (UE) positioning in E-UTRAN"* Section 4.3.3.

In the example GSM system, the NMR contains the mobile generated Measurement Results. The purpose of the Measurement Results information element is to provide the results of the measurements made by the mobile station regarding the serving cell and the neighbor cells. The Measurement Results information element is coded as shown in GSM/3GPP Technical Specification 04.08, *"Mobile radio interface layer 3 specification"* section 10.5.2.20 (Measurement Report).

The mobile location center (MLC) uses NMR delivered cell-id (in GSM the Cell-Global-Identity (CGI) gives the cell and sector) as the geographical starting point. The timing advance (TA) value allows computation of a range from the starting point. The Received Signal Strength Indicator (RSSI) for the serving CGI is normalized with the current mobile power settings. The Reception Level (RxLEV) values for up to six neighboring CGI Broadcast Control Channel (BCCH) beacons are then normalized against the entered value of broadcast power. Using the CGI position, the TA-derived range, and the PDOA from three or more sites, a location estimate can be calculated.

Since ECID uses PDOA multi-lateration, the geographic layout of the neighbor cells also affects the quality of the location through geographic dilution of precision (GDOP). The limitation of only six neighbor cell RxLevel measurements present in the NMR limits accuracy by limiting potential GDOP reduction though receiver site selection.

Since the PDOA measurement requires averaging over multiple samples (the GSM NMR is transmitted by the mobile station periodically during an active call), latency is much higher than for other cell-ID based techniques.

Since the RSSI measurement is based on the variable power settings for the BTS, normalization of the RSSI before inclusion into the PDOA calculation requires knowledge of the BTS forward (downlink) power control settings from the GSM WCN.

Calibration may be used improve accuracy in ECID location systems. ECID Calibration can include the use of predictive RF propagation mapping and extensive drive testing to create a grid of CGI/RxLev "fingerprints". By mapping the neighbor list and received signal levels over the coverage area, it is possible to achieve medium accuracy results within the range of 200-500 meters in networks having relatively high BTS density.

In U.S. Pat. No. 7,486,233, a single site ECID location system is taught where the power measurements from a single 3-sector Base Transceiver Station (BTS) with a serving sector and two co-sited sectors allow the formation of a sector limited timing range band and a directional angle from the BTS cell site.

The inventive techniques and concepts described herein apply to time and frequency division multiplexed (TDMA/FDMA) radio communications systems including the widely used IS-136 (TDMA), GSM, and Orthogonal Frequency Division Multiplexed (OFDM) wireless systems such as LTE, LTE-Advanced and IEEE 802.16 (WiMAN/WiMAX). The Global System for Mobile Communications (GSM) model discussed is an exemplary but not exclusive environment in which the present invention may be used.

SUMMARY

Disclosed herein is a method for processing readily available radio network, timing and power information about cellular networks and typical measurements made by the mobile device and network. A probabilistic method is disclosed that uses both time (i.e. range) and power differences to locate mobiles with accuracy better than cell-ID with ranging, with high capacity and without the need for calibration.

One illustrative embodiment of the present invention provides for a method for use in locating a mobile device. This embodiment of the inventive method includes the step of causing a mobile device to receive beacon signals from a serving base transceiver station (BTS) and one or more adjacent BTS. Each BTS is located at a cell site and each beacon signal includes cell identification (CID) information. A number of sibling pairs based on the received beacon signals is detected. A sibling pair may comprise two downlink transmission antennae that are co-sited sectors of a multi-sector cell site. Next, a predefined location method is selected based on the number of sibling pairs detected. The mobile device measures broadcast beacon power received from each of a number of cell sites and reports the power measured and identity of cell site sectors that have the largest measured powers, as well as a timing advance (TA) value determined by the network and relayed to the mobile device. The TA value serves as a range measurement from the serving cell sector to the mobile device In the illustrative embodiments, when the number of sibling pairs detected is zero, a power-difference-of-arrival with ranging (PDOA) location method is selected. When the number of sibling pairs detected is one, either a single site location method or an adjacent site location method is selected. When the number of sibling pairs detected is greater than one, one of either a power angle-of-arrival (AoA) location method or a power AoA with ranging location method is selected.

In the illustrative embodiments, the method may be employed to geolocate a mobile device operating in a sectored wireless communications network (WCN) with medium accuracy using information about the WCN that is stored in a database in combination with measurements made by the mobile device in the network in the course of supporting mobility. In this regard, a bearing/angle from a sectored cell site to the mobile device may be determined from power measurements from a pair of adjacent sectors (siblings) and knowledge of the spatial response and orientation of the sector antennas. Next, a timing range or power-derived range value from the serving cell with power difference measurements between siblings with the largest measured powers from one or more cell sites may be employed to determine a location estimate of the mobile device In the embodiments recounted above, the AoA location method or power AoA with ranging location method comprises a probabilistic method for geolocation of mobile devices using sibling pairs. Timing (Timing Advance (TA) in GSM) information and power information from the wireless network is derived by creating a model of the timing advance and power difference between siblings of neighbor cells over the range band.

Additional features and aspects of the present invention are described below.

BRIEF DESCRIPTION OF THE DRAWINGS

The foregoing summary as well as the following detailed description are better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

We will now describe illustrative embodiments of the present invention. First, we provide a detailed overview of the problem and then a more detailed description of example embodiments of the present invention.

A. Overview

Determining the location of a transmitter is commonly achieved by measuring characteristics of the transmitter's signal at a number of known locations. Typical characteristics measured include signal power (RSSI), time-of-arrival (TOA), angle-of-arrival (AoA), or any combination thereof. GSM mobiles may be geolocated in sectored GSM networks with medium accuracy using information about the network that is readily available and measurements typically made by the Mobile Station (MS) in the network during course of supporting mobility.

The readily available network information includes the geographic location of the cell sites, the spatial response of the sectored antennas including their geographic and downtilt orientation, and the sector identifiers that are broadcast by each sector. For instance, GSM mobiles measure the broadcast beacon power received from each of a number of cell sites and report the power measured and identity of the six cell site sectors that have the largest measured powers to the network approximately at a rate of twice per second. Additionally, in GSM, a timing advance (TA) value is determined by the network and relayed to the mobile to permit the mobile to transmit over its entire time slot. The TA value also serves as a range measurement from the serving cell sector (CGI in GSM) to the mobile.

During the course of experimentation with Enhanced Cell-ID (ECID) location technology, it was determined that the power difference measurements between sectors of the base BTS possess minimum variability because common biases between the sectors are cancelled out and the wireless channel between the two sectors is fairly similar. With the ability to reject common bias from beacons of sectors of the same cell, the bearing, or angle, from a sectored cell site to the mobile transmitter can be determined from the power measurements from a pair of adjacent sectors, i.e. siblings, and knowledge of the spatial response and orientation of the sector antennas. Coupling the timing range (e.g. TA, RTT) or a power-derived range value from the serving cell with the power difference measurements between two sectors with the largest measured powers from one or more cell sites provide sufficient measurements to determine a location estimate of the mobile with accuracy better than cell-ID location with ranging. The Cell-ID with ranging location technique is well known (e.g., in GSM—CGI+TA, in UMTS—CID+RTT, or in LTE—PCI+TA$_{LTE}$).

FIG. 1a

Figure 1A:
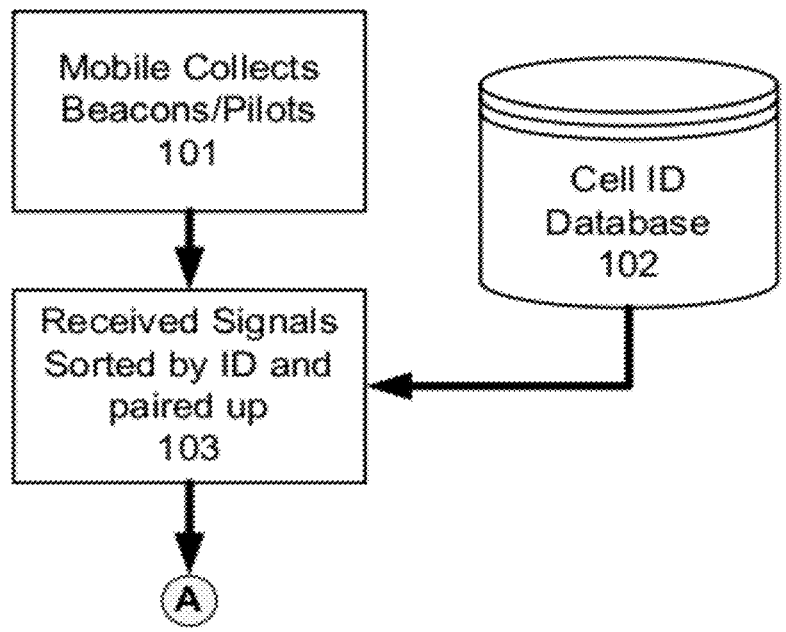
FIG. 1a schematically depicts initial signal collection and analysis.

FIG. 1a illustrates the initial steps in the mobile-assisted, network-based determination of location in accordance with the present invention. As shown, the mobile device collects the downlink beacon signal strengths and identifiers 101. The mobile transmits these signals to the Radio Access Network (RAN). This collection and transmission from the mobile device is performed by the mobile in the normal course of operation as part of the Mobile-Assisted-Handoff (MAHO) technique typically used by modern cellular systems.

The downlink beacon signal strengths and identifiers are forwarded by the RAN to the Serving Mobile Location Center (SMLC) or passively monitored and sent to the SMLC. Examples of passive monitoring triggering platforms are described in U.S. Pat. No. 6,782,264, "Monitoring of Call Information in a Wireless Location System" and U.S. Pat. No. 7,783,299; "Advanced Triggers for Location Based Service Applications in a Wireless Location System," both incorporated herein by reference.

The SMLC, part of the WLS, contains or has access to a database of beacon identifiers, transmitter antenna geographic locations, transmitter signal powers and radio base station downlink (transmit) antenna gain patterns. This database is deemed the cell-ID database 102. Using the cell-ID database and the collected signal information, the received signals are then sorted by cell (cell/sector) identifier and any sibling pairs identified 103. A sibling pair is two downlink transmission antennae that are co-sited sectors of a multi-sector cell site. Further processing, shown by the marker "A", is dependent on the number of sibling pairs detected.

FIG. 1b

Figure 1B:
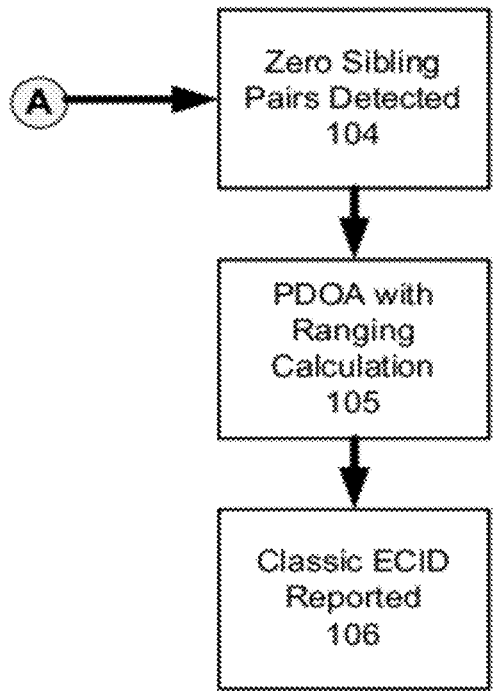
FIG. 1b illustrates a location process for the no sibling sector case.
Figure 1C:
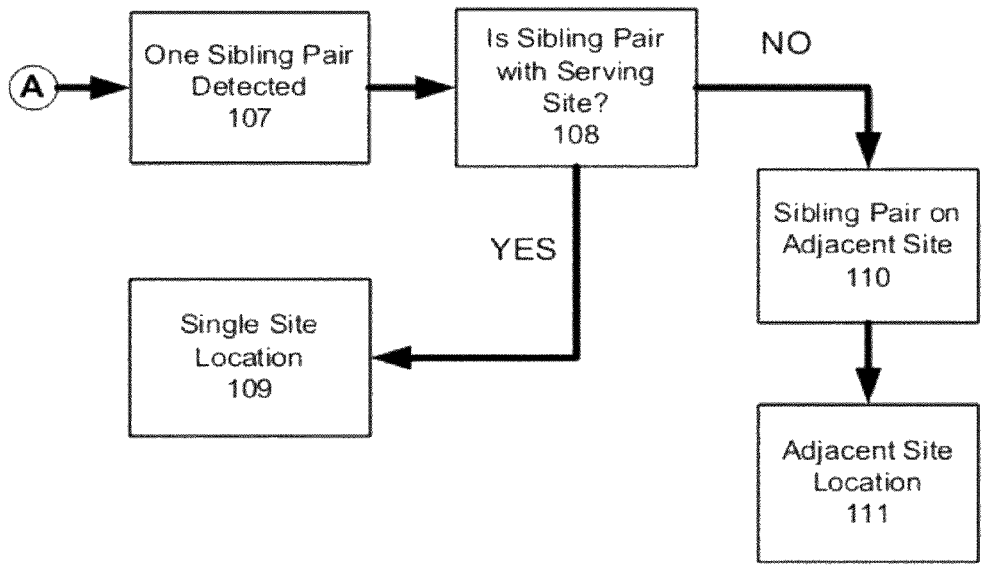
FIG. 1c illustrates a location process for a single sibling pair scenario.
Figure 1D:
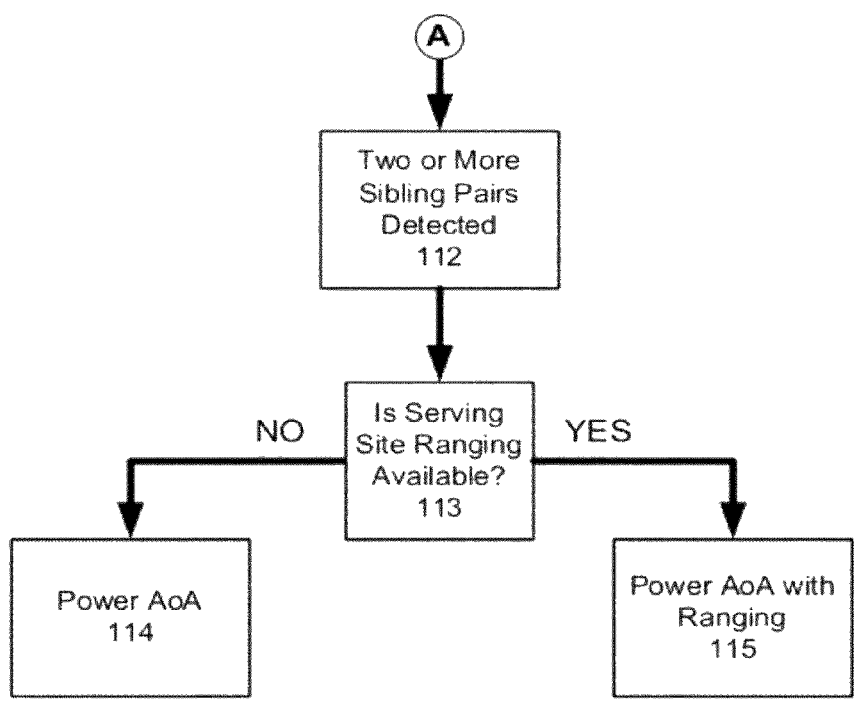
FIG. 1d illustrates a location process for when two or more sibling pairs are detected.

FIG. 1b depicts the case where no sibling pairs were detected 104. Since no siblings are available, only a power-difference-of-arrival with ranging calculation can be performed 105. Since only a classic enhanced-cell ID (ECID) location can be reported 106, the location accuracy will vary widely based on the cell structure and coverage areas.

With ECID, the cell-ID (CGI) component will allow determination of the latitude and longitude of the serving tower or sector antenna while the Timing Advance (TA) determined ranging allows for reduction of the error radius to a band approximately 554 meters wide in the case of sectored cells. If sufficient (three or more) neighbor cells are available via the mobile device beacon collection and if the cell geometry does not result in extremely high geometric dilution of precision, the added PDOA-based location measurement can significantly improve location accuracy over that of a CGI+TA location estimate. The PDOA measurement does include its own location error component, since a 3-20 dB path-loss variation due to self or local interference is possible.

FIG. 1c

If a sibling pair is detected 107 from the analysis 103 of the mobile collected signal data 102, then a power-based angle of arrival technique can be used to improve the classic ECID location.

The sibling pair is further analyzed to determine if the sibling pair is associated with the serving cell 108. If yes, then a single site location 109 will be performed as detailed in U.S. Pat. No. 7,486,233. If the sibling pair is found to be associated with an adjacent cell site 110, then Adjacent Site Location 111 is performed.

FIG. 1d

If more than one sibling pair is detected 112 from the analysis 103 of the mobile collected signal data 102, then a power-based angle of arrival technique can be used to improve the classic ECID location. Availability of two or more sibling pairs also allows for location even if the time or power based ranging is not available or not granular enough (for instance in GSM, the timing range band increments in 554 meter steps) to allow a precise location. With each sibling pair allowing a power-based Angle of Arrival (AoA) to be determined, this technique has been deemed "power AoA".

If serving site ranging is available 113, then a power AoA with ranging calculation is possible 115. If serving site ranging is not available, a purely power AoA calculation 114 is still possible.

B. Power-Based Angle of Arrival

The angle-of-arrival (AoA), or line-of-bearing (LOB), of a signal may be determined from a common site by receiving the signal with two antennas that have an identical, or similar, spatial response but are pointed in different directions. The decibel power, i.e. dBm, of the signal received from each antenna is averaged to mitigate the effect of fast fading. The decibel difference in the averaged signals from the two antennas is determined The AoA of the signal can then be determined from this decibel difference and knowledge of the antennas spatial responses.

Many wireless communications systems break the 360 degree omnidirectional coverage into three overlapping sectors to increase their communications capacity through frequency reuse. A coverage area is defined as the area illuminated by the downlink beacon radio signal. Typically, the 360 degree omnidirectional coverage region is split into three 120 degree sectors through the use of directional antennas. Ideally, each sector antenna will cover only its 120 degree region and none of its adjacent sectors' regions. Practically, this would require a very large antenna so smaller antennas are utilized that overlap.

Characterizing sector antennas in a generic fashion makes it easy to determine the AoA from the decibel power differences between two antennas. Antennas can be characterized by their half-power-beamwidth (HPBW) in the vertical dimension, their HPBW in their horizontal dimension, and their front-to-back ratio (FBR). The HPBW of an antenna that is symmetric about its boresite is defined as the angular separation from a point on the left side of the antenna where its power response is 3 dB below its peak response at boresite to the point on the right side of the antenna where its power response is 3 dB below its peak response. The FBR of an antenna is defined as the decibel difference between the antenna's maximum decibel power response at its boresite to its decibel power response 180 degrees away from its boresite.

Antennas are often characterized in a normalized fashion by setting their maximum decibel power response to 0 dB. A generic model for the normalized, horizontal plane, decibel power response of an antenna can be expressed mathematically as:

$$G_{dB}(\phi) = 10 \log_{10}[C_1 + C_2 \cos(\phi)]^\alpha$$

where the antenna pattern model parameter $\alpha$ is derived based upon the corresponding horizontal HPBW, $\Theta_h$, as:

$$\alpha = \frac{\log_{10}[0.5]}{\log_{10}[C_1 + C_2 \cos(\Theta_h/2)]}$$

With the constraint that $C_1 + C_2 = 1$ and $$FBR_{dB} = 10 \log_{10}(C_1 - C_2)^\alpha.$$

Figure 9:
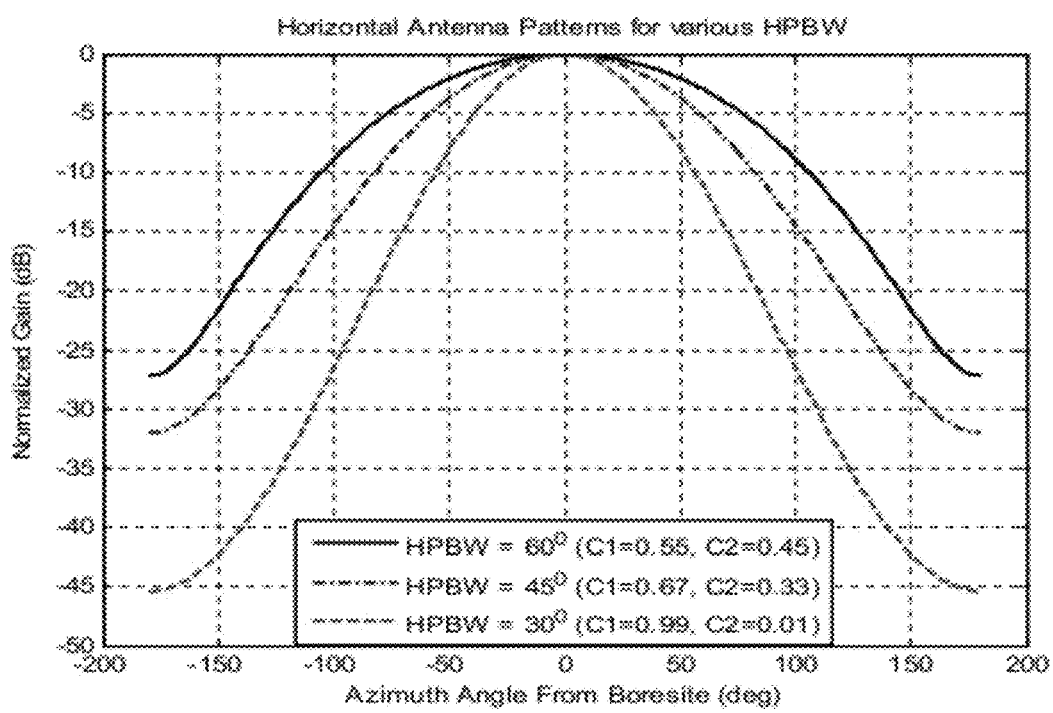
FIG. 9 illustrates radiation patterns of representative directional antenna using the half power beamwidth.

Plots of normalized antenna patterns for three different HPBW and their corresponding values of $C_1$ and $C_2$ are shown in FIG. 9.

Figure 10:
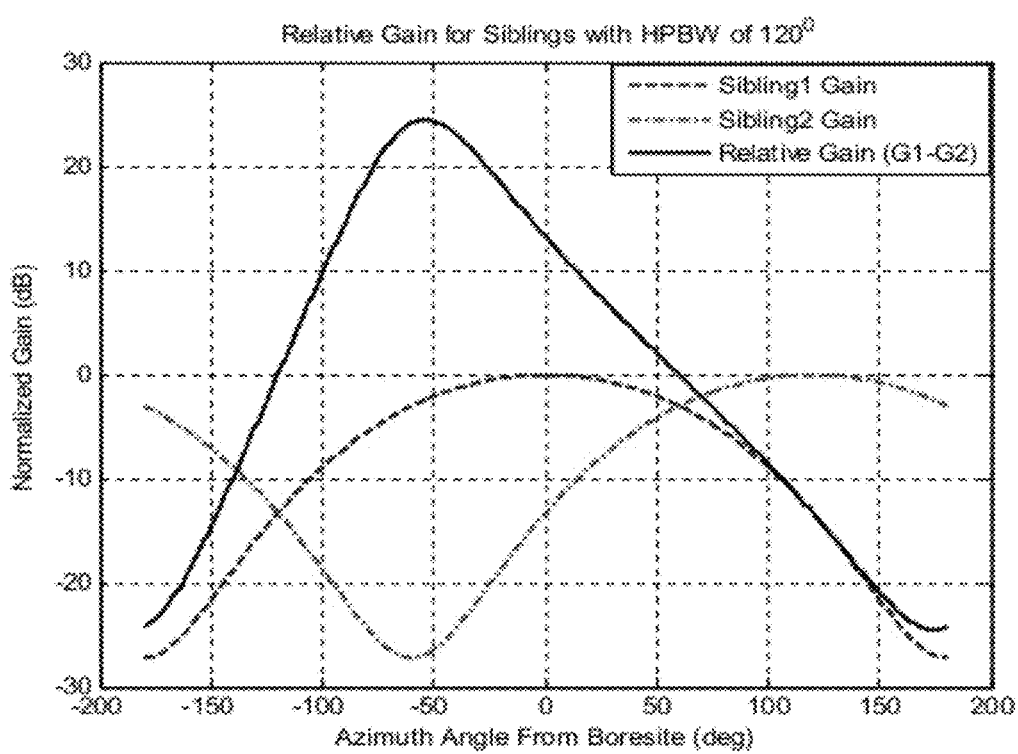
FIG. 10 illustrates a use of sibling pairs of antenna in the generation of an azimuth through relative gain with 120 degree directional antenna.

Similarly, a plot of the decibel power difference between two 120 degree HPBW antennas with boresites at 0 degrees and 120 degrees are shown in FIG. 10 for the entire 360 degrees omnidirectional response of both antennas. Note that between the two antennas boresites the power difference will vary from +12 dB to −12 dB in a linear fashion with a negative slope of −0.2 dB per degree. Also note that the decibel power difference is not single valued over the entire omnidirectional 360 degree range. Another duplicate value occurs outside the angular range between the two antennas' boresites. Thus when determining the AoA utilizing the power difference between these two antennas, two angles will result. One AoA is the correct one and the other is an ambiguous one. These types of ambiguous AoAs can be resolved when solving for the location of the mobile in a probabilistic manner

C. Model Based Location Estimation Utilizing Sibling Sector Power Differences and Serving Sector Timing Advance Location estimation of mobiles operating on a wireless network can be achieved with measurements that are commonly made by the mobiles as well as timing measurements made by the network. Specifically, mobiles make power measurements of nearby cell sites and sectors to assist in handoff to those sectors as they move about the coverage area. Networks make range timing measurements from the serving cell/sector site to the mobile to time synchronize the mobile to the network for proper operation. The decibel difference in the power between measurements of two adjacent sectors in a cell site, i.e. sibling pair, provides a robust indication of the direction the mobile with respect to the cell site. Practically, power difference measurements have two important advantages. First, common biases in the mobile's power measurement are cancelled, providing a more accurate measurement. Second, the wireless channel between the mobile and each of the two adjacent sectors will be similar, resulting in less variation between them which results in less variation in location estimates. Power difference measurements from two or more cell sites can be compared with a model over the coverage area to determine potential locations of the mobile. A range measurement from the serving cell site/sector can be used to limit the search range for locating a mobile, typically providing a unique location.

In an illustrative example, a transmitter and receiver are separated by a distance r and there is a direct path from the transmitter to the receiver and no multipath present, i.e. the definition of free space propagation. The transmitter has a power of $P_T$ and an antenna with a gain of $G_T(\theta)$ where $\theta$ represents the spatial variation of the antenna's gain. The received power is given as the transmitter power multiplied by the gains of the transmit antenna in the direction of the receiver $\theta_o$, multiplied by the effective area of the receive antenna $A_e(\theta)$ in the direction of the transmitter $\theta_o$. Additionally, we divide this quantity by the area of a sphere of radius r to account for the reduction in the power density of the RF signal at a distance r from the transmitter, or source, due to spherical spreading of the radio wave as it propagates from the transmitter to the receiver. This is written as:

$$P_R = \frac{P_T G_T(\theta_o) A_e(\theta_o)}{4\pi r^2}.$$

The effective area of the receive antenna is related to the gain of the receive antenna as:

$$G_R(\theta) = \frac{4\pi A_e(\theta)}{\lambda^2}$$

where $\lambda$ is the wavelength of the RF signal. Combining these two equations yields:

$$P_R = \frac{P_T G_T(\theta_o) G_R(\theta_o)}{\left(\frac{4\pi r}{\lambda}\right)^2}.$$

The product of the wavelength of the signal, $\lambda$, and its frequency, f, is equal to the speed of light, c, as:

$$c = f\lambda.$$

The speed of light is equal to $3 \times 10^8$ meters per second. The wavelength can be expressed in terms of the frequency of the signal in MegaHertz (MHz) as:

$$\lambda = \frac{300}{f_{MHz}}.$$

Substituting results in:

$$P_R = \frac{P_T G_T(\theta_o) G_R(\theta_o) 300^2}{(4\pi f_{MHz} r)^2}.$$

The above equation indicates that with all other parameters constant, the received power will vary as the inverse of the square of the distance from the transmitter. This is accurate for free space propagation; however, for the land mobile radio propagation channel the $1/r^2$ factor needs to be substituted by $1/Kr^\alpha$, where $\alpha$ is typically between 2 and 4, to model the received power correctly. Therefore, the power received for a land mobile propagation scenario is expressed as:

$$P_R = \frac{P_T G_T(\theta_o) G_R(\theta_o) 300^2}{(4\pi f_{MHz})^2 K r^\alpha}.$$

Taking 10 times the base 10 logarithm of the above equation yields the power in dBm as:

$$P_{R_{dBm}} = P_{T_{dBm}} + G_{T_{dB}}(\theta_o) + G_{R_{dB}}(\theta_o) + 20\log_{10}\left(\frac{300}{4\pi}\right) - 20\log_{10}(f_{MHz}) - K_{dB} - 10\alpha\log_{10}(r).$$

The difference in power received by the mobile between two sectors at the same cell site will yield an equation that is only dependent upon the difference in the gains of the two sector antennas assuming the two sectors transmit at the same frequency and at the same power level. All other parameters cancel in the differencing operation. This is written as:

$$\Delta P_{dB}(\theta) = P_{R1_{dBm}} - P_{R2_{dBm}} = G_{T1_{dB}}(\theta) - G_{T2_{dB}}(\theta).$$

Figure 8:
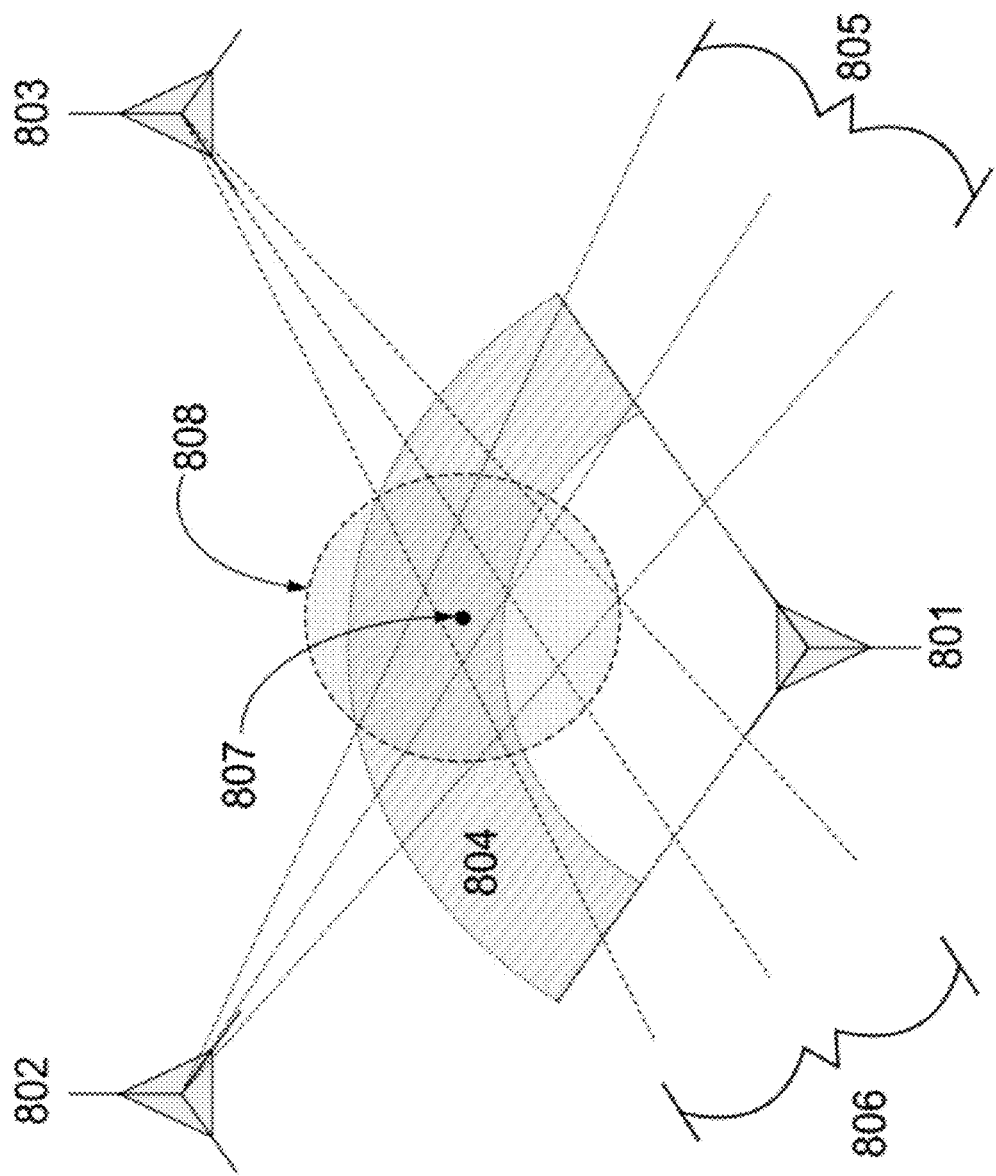
FIG. 8 illustrates spatial responses of the sibling sector antennas lines of constant power differences in forming azimuths.

Therefore, with this model and with knowledge of the spatial responses of the sector antennas, lines of constant power differences can be drawn from two cell sites as shown in FIG. 8. The powers from these sectors can be measured and their differences taken and compared to the model to find where the two lines that are closest to the measured values intersect for a unique location.

The range of a mobile from its serving cell is typically known by the wireless network because the mobile must be time synchronized to its serving cell to some level for proper operation. Typically, the distance of the mobile from its serving sector is known over a band of ranges because of quantization of the time synchronization. Additionally, for sectored cell sites, the spatial response of the serving sector's antenna will limit the range band over an angular range. This information can be incorporated in the location determining process for increased accuracy and efficiency.

FIG. 8 geographically illustrates this concept where the search for the intersection of the two lines of power differences that best match those measured by the mobile is limited to the range band of the serving sector. In the FIG. 8 scenario, three cell sites 801 802 803, each with three sectors, are shown. Using the beacon signal strengths and identifiers sent by the mobile device, two sets of sibling pairs are found, one pair associated with the first adjacent cell site 802 and one pair associated with the second adjacent cell site 803. The serving cell 801 determines a timing or power-based range shown by the range band 804.

Using the sibling pair technique, lines of constant power difference 805 can be shown from the first adjacent cell site 802. Similarly, lines of constant power difference 806 can be shown from the second adjacent cell site 803.

The overlap between the line of bearings formed by the lines of constant power difference 805 806 and the range band 804 allow for determination of a most likely location 807 and an error range 808.

FIG. 7a

Figure 7A:
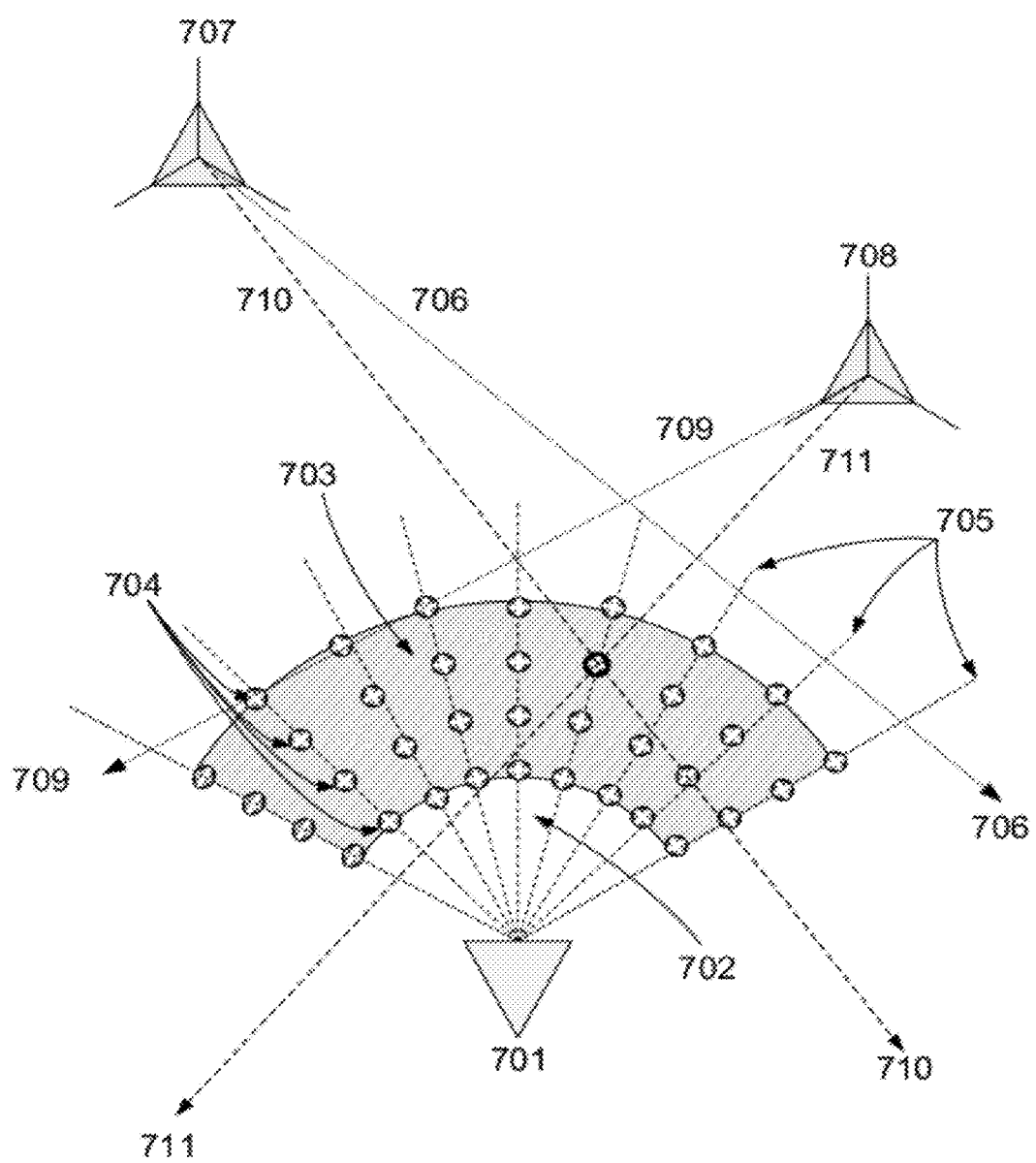
FIG. 7a illustrates a probabilistic time and power-based location determination algorithm geometrically.

FIG. 7a geographically depicts a probabilistic method for power AoA using sibling pairs.

A serving cell 701, a first adjacent cell 707 and a second adjacent cell 708 are involved in this location estimation example of the Power AoA or Adjacent Sector technique. The serving cell site 701 has a serving sector 702. The serving sector 702 has a reported (by the mobile) range band 703. The joint area of the serving sector 702 and range band 703 is subdivided radially into 2 or more divisions based on the cell size. On reach radial 705, 1-to-n "pixels" 704 are placed to generate a uniform coverage within the range band 703.

In the FIG. 7a example, two sibling pairs of sector downlink transmit antenna have been discovered at the first 707 and second 708 adjacent cell sites. Using the normalized reported downlink power for each sibling pair, a first 706 and second 709 measured azimuth can be plotted.

Then for each pixel 704, a first 710 and second 711 theoretical azimuth is created for each pixel 704 using the pixel location, the previously determined antenna characteristics, and the normalized reported downlink power. The difference between the first measured azimuth 706 and the first theoretical azimuth 710 is determined for each pixel 704. The difference between the second measured azimuth 709 and the second theoretical azimuth 711 is also then determined for each pixel 704. These differences between the measured and theoretical model allow weighting of the pixel's location as a probability. Pixels showing minimal measured vs. modeled differences are granted a high weight.

Once computation and weighting is concluded, a final location estimate is computed as the weighted average of the K pixels with the smallest geographic differences between the modeled and measured.

FIG. 7b

Figure 7B:
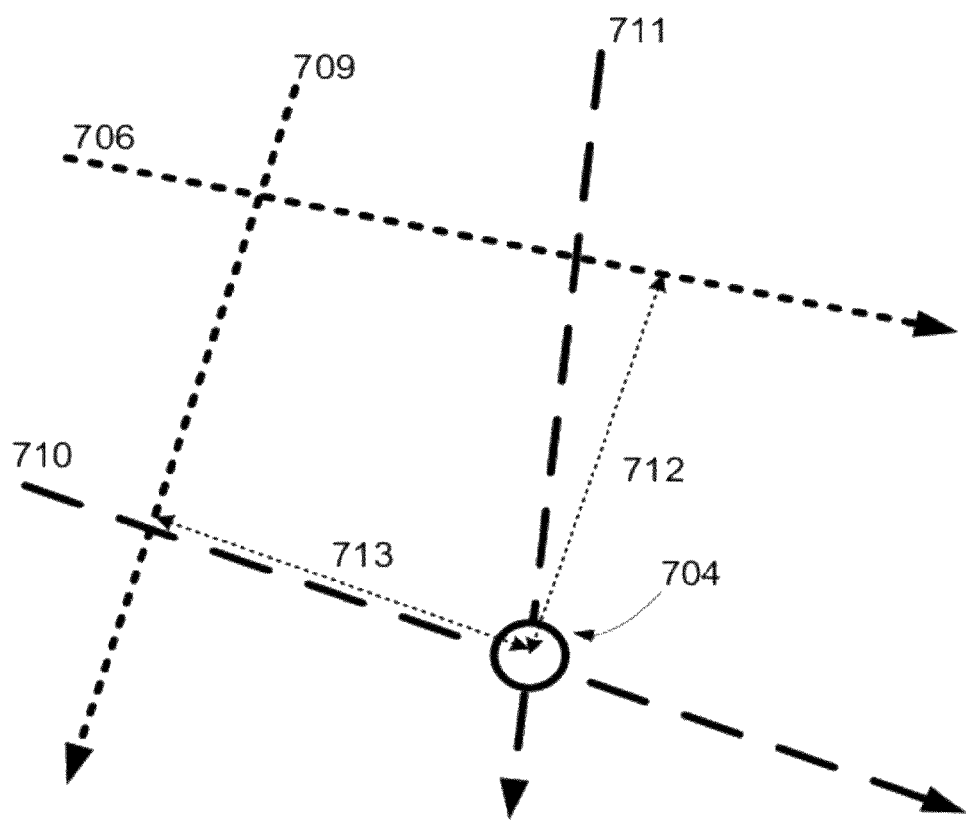
FIG. 7b details geographic differences between the measured and modeled azimuths.

FIG. 7b illustrates geometrically the determination of the differences which generate the probability weighting for a single pixel 704. The first measured 706 and the first modeled 710 azimuth for first adjacent cell 707 are shown. The first modeled azimuth 710 passes through the pixel 704. The difference between the first measured 706 and the first modeled 710 azimuth is shown geographically 712.

If a second sibling pair exists, then the second measured 709 and the second modeled 711 azimuth are shown. The second modeled azimuth 711 passes through the pixel 704. The geographic difference 713 between the second measured 709 and the second modeled 711 azimuth is shown.

Mathematically, a probabilistic approach for geolocation of mobiles using timing (Timing Advance (TA) in GSM) information and power information from the wireless network can be derived by creating a model of the timing advance and power difference between siblings of neighbor cells over the range band. These parameters are assumed to possess a Gaussian distribution with a known variance and a mean value equal to the model, or predicted value. Gaussian like weights are defined as:

$$W = e^{-\frac{(measured - predicited)^2}{2\sigma^2}}$$

for each of the parameters. The weights are evaluated over the range band for all of the parameters. This is accomplished by evaluating the weights at a number of points or "pixels" uniformly distributed about the range band as shown in FIG. 7a. At each "pixel" the weights are combined in some fashion, i.e. multiplied and/or added for a final result at each pixel's location. The final location estimate is computed as the weighted average of the K pixels with the largest results. The effective weight at each pixel is given as:

$$W = W_{RSSI} W_{TA} W_{AZ}.$$

The effective weight of cumulative relative power matching error of all the reported cell sites at each pixel is given by one of the following two methods (sum or product of individual weights), $$W_{RSSI} = \prod_{n=1}^{N} W_n * W_{RSSIn} \text{ or } W_{RSSI} = \sum_{n=1}^{N} W_n * W_{RSSIn}$$

$W_{RSSIn}$ represents a Gaussian weight as:

$$W_{RSSIn} = e^{\left(-\frac{(|RP_{meas}-RP_{pred}|-3)_n^2}{2\sigma_{rssi}^2}\right)}$$

$RP_{meas}$ is where RP is the measured relative power in dB between sibling sectors at cell site n, $RP_{pred}$ is the model of the relative power, i.e. the predicted value, in dB between sibling sectors at cell site n at the pixel and $\sigma_{RSSI}^2$ is the known apriori variance of the relative powers over the coverage area. This weight value is only used when the magnitude of the difference between $RP_{meas}$ and $RP_{pred}$ is i greater than 3 dB. When the magnitude is less than or equal to 3 dB, $W_{RSSIn}$ is set equal to 1.

$W_n$ is a reliability weight of RF modeling as a function of measured RSSI difference and is given by:

$$W_n = e^{\left(-\frac{(|RP_{meas}|-20)_n^2}{2\sigma_g^2}\right)}$$

when the magnitude of the measured relative power in dB at cell site n, i.e. $RP_{meas}$, is greater than 20 dB. Otherwise, $W_n$ is given a value of 1. The weight for the TA distance error is given by the following normal distribution:

$$W_{TA} = e^{\left(\frac{-(d_{TA}-d)^2}{2\sigma_{TA}^2}\right)}$$

where $d_{TA}$ is the measured TA distance, d is the distance of the pixel, and $\sigma_{TA}^2$ is the known apriori variance. When measurements from more than one serving sector are available, the area that pixels are calculated over is the intersection of the TA bands and $W_{TA}$ is:

$$W_{TA} = \prod_{s=1}^{S} e^{\left(-\frac{(d_{TA}-d)_s^2}{2\sigma_{TA}^2}\right)}.$$

The server probability weight as a function of azimuth angle from the bore site direction is given by:

$$W_{AZ} = \begin{cases} 1 \text{ for, } \theta \leq HBW \\ \left(\frac{[0.5+0.5\cos(\theta)]}{[0.5+0.5\cos(HBW)]}\right)^4 \text{ for, } |\theta| \geq HBW \end{cases}$$

Again, the weight for a pixel is the product of the three weights.

The final step of the location estimation involves sorting weights for all of pixels from largest to smallest and then choosing the K largest ones and calculating a location that is the weighted sum of the pixel locations associated with these K weights. Mathematically, this is written as:

$$x_{est} = \frac{\sum_{i=1}^{K} W_i x_i}{\sum_{i=1}^{K} W_i} \text{ and } y_{est} = \frac{\sum_{i=1}^{K} W_i y_i}{\sum_{i=1}^{K} W_i}$$

D. Specific Embodiments

D.1. Power AoA with 3-Sectored Serving and Adjacent Site(s)

Figure 2:
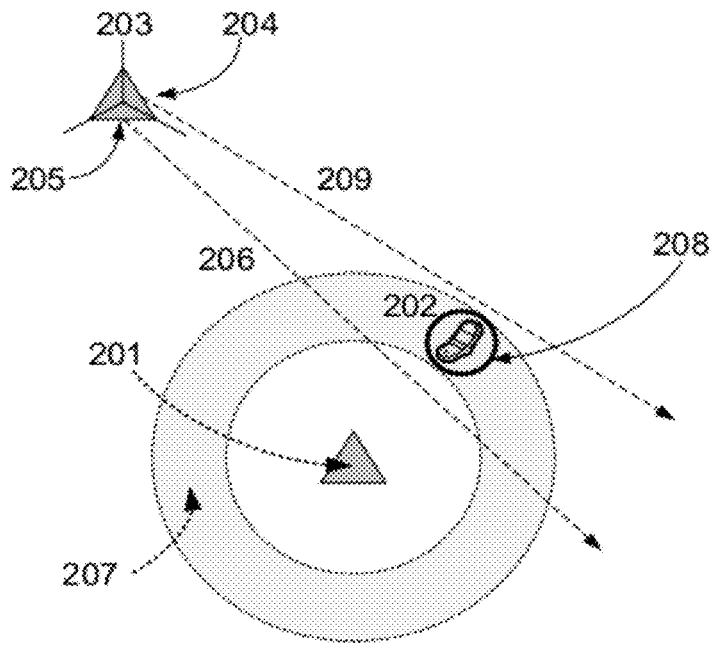
FIG. 2 geographically depicts a location scenario for a single sibling pair in an adjacent cell site.

In FIG. 2, the location of a mobile device 202 using information from an omni-directional serving cell 201 and a neighboring sectored cell 203 is shown.

The serving cell site 201 has a single serving sector (a CGI in GSM terminology or PCI in LTE) with a range band 207. The size and width of range band 207 is based on the value of the Timing Advance (TA) and the precision of the Timing Advance value (a TA width is 554 meters in GSM and 156 meters in LTE). The mobile device (e.g., an MS or UE) 202 must be active to allow production of measurement reports, but can be in a control channel transaction or traffic channel transaction while active. The active MS/UE 202 has a bidirectional radio link with the serving cell 201 and periodically scans and receives the beacon broadcasts from the sectors 204 205 of the adjacent cell 203.

Using the normalized received power and antenna models, bearing angles 206 209 corresponding to a standard deviation on either side of the mean bearing angle estimate originating from each sector 204 205 transmit antenna can be calculated. By combining the angle information standard deviations 206 209 and the range band 207, a location estimate 208 for the mobile device can be calculated. This location estimate 208 is superior in accuracy as compared to a conventional cell-ID based location in an omnidirectional cell (the latitude and longitude of the serving cell 201). The estimated location error here can be calculated as the area encompassed by the range band 207 and the standard deviation of the bearing angles 206 209.

D.2. Power AoA with Omnidirectional Serving and Sectored Adjacent Site(s)

Figure 3:
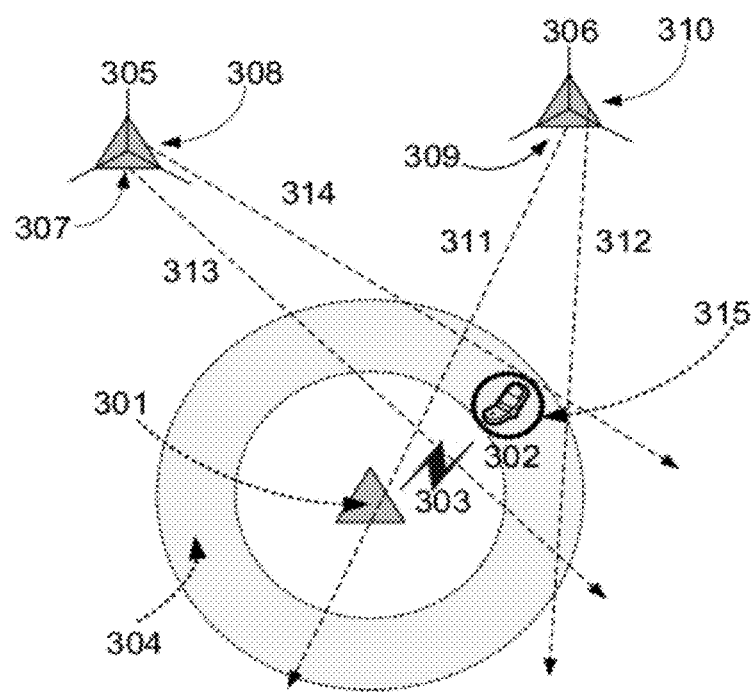
FIG. 3 geographically depicts a location scenario for when two sibling pairs exist in two adjacent cell sites.

In FIG. 3, the location of a mobile device 302 using an omni-directional serving site 301 and 3-sectored adjacent cell sites 305 306 is shown. In the serving cell/sector 301, a range band 304 is shown based on the value of the Timing Advance and the precision of the Timing Advance value. The mobile device 302 must be active to allow production of measurement reports, but can be in a control channel transaction or traffic channel transaction while active. The active MS/UE 302 has a bidirectional radio link 303 with the serving cell 301 and periodically scans and receives the beacon broadcasts from sectors 307 308 of cell 305 and from sectors 309 310 from cell 306.

Using the normalized receive power and antenna models, a set of bearing angles 311 312 313 314 corresponding to the standard deviation of the bearing angle estimates can be plotted for each reported sector 309 310 307 308 transmit antenna. By combining the angle information from bearing angles 311 312 313 314 and the serving cell 301 range band 304, a location estimate 315 for the mobile device can be calculated. This location estimate 315 is superior in accuracy as compared to a conventional cell-ID based location in an omnidirectional cell (the latitude and longitude of the serving cell 301). The estimated location error here can be calculated as the area encompassed by the range band 304 and the standard deviations of the bearing estimates 311 312 313 314.

D.3. Power AoA with Two Nearby Sectored Sites

Figure 4:
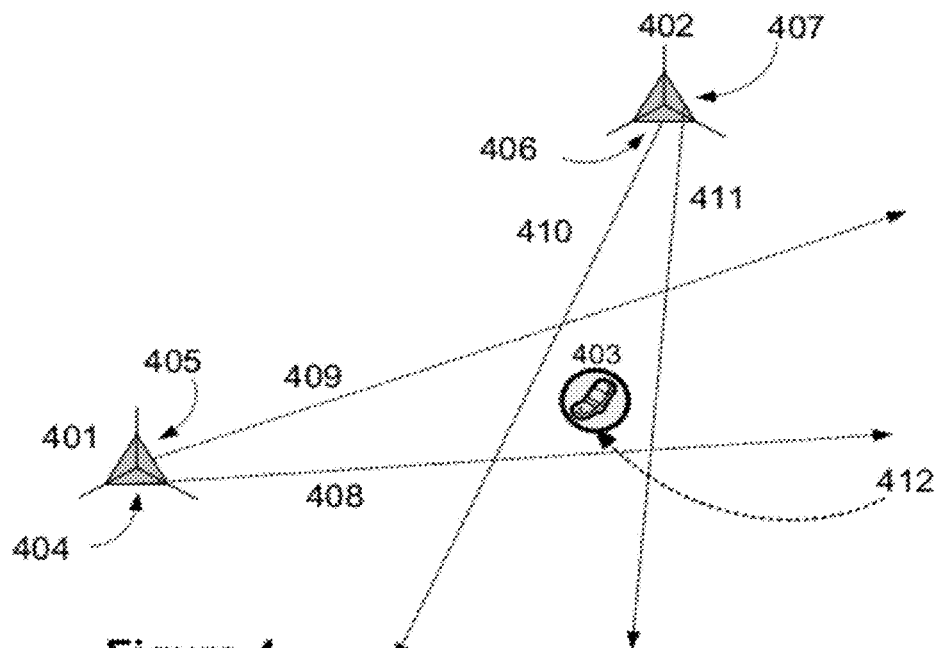
FIG. 4 illustrates geographically depicts a location scenario for when two sibling pairs exist in two adjacent cell sites and no timing range from the serving cell is available.

In FIG. 4, the location of a mobile device 403 using nearby sectored cell sites 401 402 is shown. In this scenario, no serving cell power or timing range band is needed. The mobile device 403 need not be registered, active, or engaged in duplex communications with the wireless system providing the downlink beacons.

The mobile device 403 scans and receives the downlink beacon broadcasts from the sectors 404 405 of cell 401 and from sectors 406 407 from cell 407.

Using the normalized receive power and antenna models, a set of bearing angles 408 409 410 411 corresponding to the standard deviation of the bearing angle estimates can be plotted for each received sector 404 405 406 407 transmit antenna. By combining the angle information from bearing angles 408 409 410 411, a location 412 for the mobile device 403 can be calculated. The information needed for calculation of the mobile location 412 (the transmission antenna broadcast power, the antenna models, and the location of each downlink transmission antenna) may be broadcast by the wireless network, recorded locally on the mobile device 403, or received from an alternative radio network. In some scenarios, the mobile device 403 may collect the downlink signals and transmit over alternative means to a landside server for location calculation.

D.4. Power AoA with Three Nearby Sectored Sites

Figure 5:
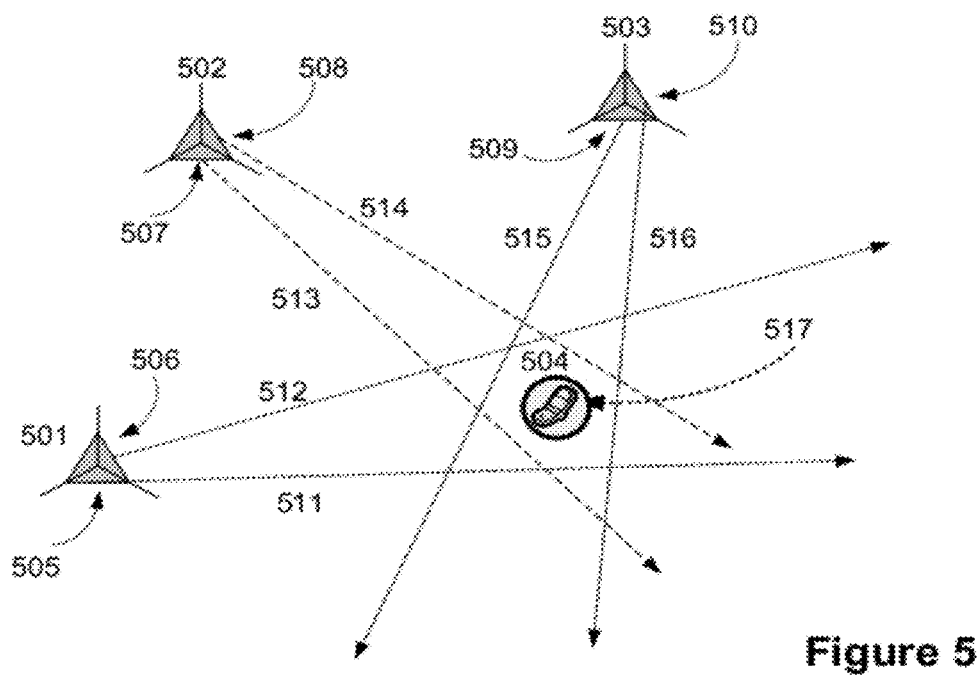
FIG. 5 illustrates geographically depicts a location scenario for when three sibling pairs exist in two adjacent cell sites and no timing range from the serving cell is available.

In FIG. 5, the location of a mobile device 504 using nearby sectored cell sites 501 502 503 is shown. In this scenario, no serving cell power or timing range band is needed. The mobile device 504 need not be registered, active, or engaged in duplex communications with the wireless system providing the downlink beacons.

The mobile device 504 scans and receives the downlink beacon broadcasts from sectors 505 506 of cell 501, sectors 507 508 of cell 502, and sectors 509 510 of cell 503.

Using the normalized receive power and antenna models, a set of bearing angles 511 512 513 514 515 516 corresponding to the standard deviation of the bearing angle estimates can be plotted for each received sector 505 506 507 508 509 510 transmit antenna. By combining the angle information from bearing angles 511 512 513 514 515 516, a location 517 for the mobile device 504 can be calculated. The information needed for calculation of the mobile location 517 (the transmission antenna broadcast power, the antenna models, and the location of each downlink transmission antenna) may be broadcast by the wireless network, recorded locally on the mobile device 517, or received from an alternative radio network. In some scenarios, the mobile device 504 may collect the downlink signals and transmit over alternative means to a landside server for location calculation.

FIG. 6.

Figure 6:
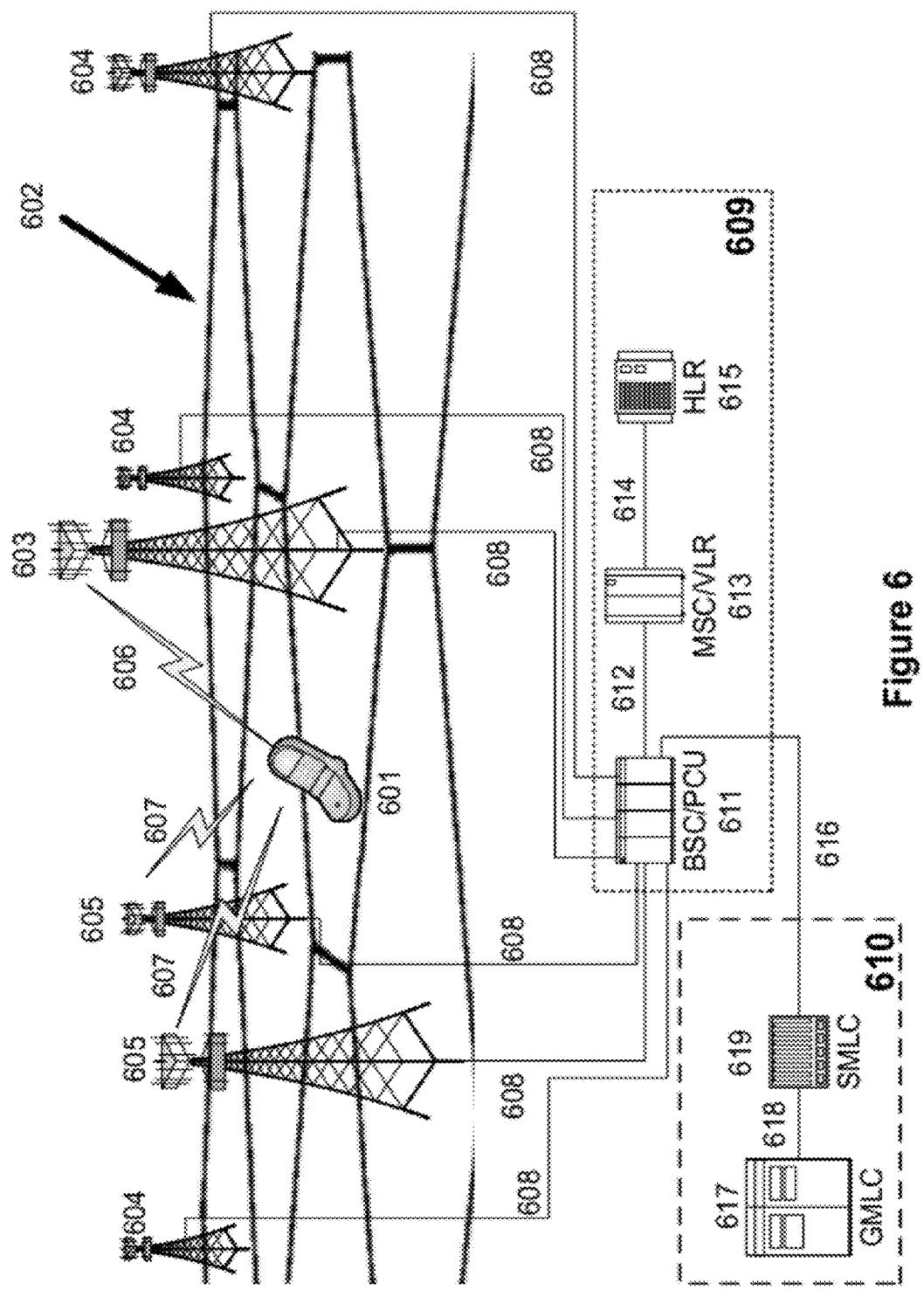
FIG. 6 geographically depicts a mobile-based collection of downlink signals in a radio access network.

FIG. 6 depicts a Wireless Communications Network (WCN) for voice and data communications. The WCN is comprised of the Radio Access Network (RAN) 602 and the Core Network 609. A Wireless Location System (WLS) 610 is deployed to support location services.

The RAN 602 is comprised of a distributed network of radio transceiver stations and antennae (RTS). Also known as Base Transceiver Stations, Radio Base Stations, Base Stations, NodeB's and Enhanced NodeB's, the RTS 603 604 605 come in a variety of different sizes, providing differing coverage areas and load capabilities. In this example the RTS are further described by their roles and proximity with respect to the mobile station/User Equipment (MS/UE) 601. The serving RTS 603 establishes and maintains the radio link 606 with the MS/UE 601. The adjacent RTSs 605 and proximate RTSs 604 are potential handover candidates and the radio broadcast beacons from each RTS may be scanned by the MS/UE 601 in accordance with the beacon allocation list present in the serving RTS 603 downlink beacon.

Each RTS 603 604 605 connects with the core network 609 via a wired or wireless data link 608. In a GSM system, BTS are interconnected to a Base Station Controller (BSC)/Packet Control Unit (PCU) while in an LTE system, the eNodeB are interconnected to a Mobility Management Entity (MME).

In the GSM example, the BTS 603 604 605 are connected to the BSC/PCU 611 by the Abis interface 609. The BSC/PCU 611 connects to the Mobile Switching Center (MSC) 613 via the A interface 612. The MSC typically also serves as the Visitor Location Register (VLR) where subscriber profiles from the HLR 615 are downloaded via the SS7 network 614 as needed.

In an LTE network, the Core Network 609 is replaced by the System Architecture Evolution (SAE) which takes advantage of the all-internet protocol (IP) packet routing area networks and increased microprocessor performance to create a cheaper, scalable core network. The four main components (not shown in the FIG. 6 example) of the SAE are the Mobility Management Entity (MME), Serving Gateway (SGW), the PDN Gateway (PGW), and the Policy and Charging Rules Function (PCRF)

A Wireless Location System 610 for GSM is shown. The Serving Mobile Location Center (SMLC) 619 interconnects with the BSC/PCU 611 via the 3GPP-defined Lb interface 616. The SMLC in turn interconnects (normally via intermediary interfaces and nodes) to the Gateway Mobile Location Center GMLC 617 via the Lg interface 618.

Not shown in this example illustration is the WLS for an LTE network. The LTE WLS is comprised of the E-SMLC (Evolved SMLC for LTE) which connects to the MME as described in 3GPP Technical Specification 36.305 v9.3, *"Stage 2 functional specification of User Equipment (UE) positioning in E-UTRAN"*.

E. Alternative Embodiments

User Plane

A user-plane approach (where the handset and a landside server interact with the WCN transparently providing a data connection) to the present invention is possible using the Subscriber Identity Module (SIM) toolkit (STK).

The STK was originally defined in the European Telecommunications Standards Institute (ETSI) GSM 11.14 Technical Standard (TS) 11.14, *"Specification of the SIM Application Toolkit (SAT) for the Subscriber Identity Module-Mobile Equipment (SIM-ME) interface."* An updated toolkit standard for the GSM, UMTS, and LTE networks and the Universal Subscriber Identity Module (USIM) can be found in the $3^{rd}$ Generation Partnership Program (3GPP) TS 31.111 *"Universal Subscriber Identity Module (USIM) Application Toolkit (USAT)."*

The STK defined command set allows direct access of the MS/UE network, timing and power measurements by a landside server. Using the STK, the SMLC can request the network measurements without interaction with the WCN control nodes.

LMU-Assisted System

Location Measurement Units (LMUs) are radio receivers typically co-located with the wireless network's base stations normally installed to facilitate uplink time-difference-of-arrival (U-TDOA) and/or angle-of-arrival (AoA) location techniques.

The primary advantage of using an LMU based system with Power AoA location is the ability of an LMU to measure the received downlink beacon identifiers and signal strengths from surrounding sectors resulting in an overlay system that, when coupled with the SIM toolkit, provide location services outside the control of the wireless communications system operator.

The combination of U-TDOA with ECID for calibration of the ECID location was previously taught in U.S. application Ser. No. 11/736,950, filed Apr. 18, 2007, "Sparsed U-TDOA Wireless Location Networks."

Any of the above mentioned aspects can be implemented in methods, systems, computer readable media, or any type of manufacture. It should be understood to those skilled in the art that the various techniques described herein may be implemented in connection with hardware or software or, where appropriate, with a combination of both. For example, aspects of the invention may execute on a programmed computer. Thus, the methods and apparatus of the invention, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations. In example embodiments a computer readable storage media can include for example, random access memory (RAM), a storage device, e.g., electromechanical hard drive, solid state hard drive, etc., firmware, e.g., FLASH RAM or ROM, and removable storage devices such as, for example, CD-ROMs, floppy disks, DVDs, FLASH drives, external storage devices, etc. It should be appreciated by those skilled in the art that other types of computer readable storage media can be used such as magnetic cassettes, flash memory cards, digital video disks, Bernoulli cartridges, and the like. The computer readable storage media may provide non-volatile storage of processor executable instructions, data structures, program modules and other data for a computer.

F. Conclusion

The true scope of the present invention is not limited to the presently preferred embodiments disclosed herein. For example, the foregoing disclosure of method for use in locating a mobile device uses explanatory terms, such as Wireless Communications Network (WCN), Radio Access Network (RAN), Location Measuring Unit (LMU), and the like, which should not be construed so as to limit the scope of protection of the following claims, or to otherwise imply that the inventive aspects of the iterative approach to increasing location accuracy are limited to the particular methods and apparatus disclosed. Moreover, as will be understood by those skilled in the art, many of the inventive aspects disclosed herein may be applied in location systems that are not based on TDOA techniques. For example, the invention is not limited to systems employing LMU's constructed as described above. The LMU's and the like are, in essence, programmable data collection and processing devices that could take a variety of forms without departing from the inventive concepts disclosed herein. Given the rapidly declining cost of digital signal processing and other processing functions, it is easily possible, for example, to transfer the processing for a particular function from one of the functional elements (such as the LMU described herein to another functional element without changing the inventive operation of the system. In many cases, the place of implementation (i.e., the functional element) described herein is merely a designer's preference and not a hard requirement. Accordingly, except as they may be expressly so limited, the scope of protection of the following claims is not intended to be limited to the specific embodiments described above.

What is claimed is:

1. A method for use in locating a mobile device, comprising:
    causing the mobile device to receive beacon signals from a serving base transceiver station (BTS) and one or more adjacent BTSs, wherein each BTS is located at a cell site and each beacon signal includes cell identification (CID) information;
    detecting a number of sibling pairs based on the received beacon signals, wherein a sibling pair comprises two downlink transmission antennae that are co-sited sectors of a multi-sector cell site; and
    selecting a predefined location method based on the number of sibling pairs detected;
    wherein the number of sibling pairs detected is zero, and in response thereto a power-difference-of-arrival with ranging (PDOA) location method is selected.

2. A method for use in locating a mobile device, comprising:
    causing the mobile device to receive beacon signals from a serving base transceiver station (BTS) and one or more adjacent BTSs, wherein each BTS is located at a cell site and each beacon signal includes cell identification (CID) information;
    detecting a number of sibling pairs based on the received beacon signals, wherein a sibling pair comprises two downlink transmission antennae that are co-sited sectors of a multi-sector cell site; and
    selecting a predefined location method based on the number of sibling pairs detected;
    wherein the number of sibling pairs detected is one, and in response thereto selecting an adjacent site location method;
    wherein the adjacent site location method is selected in response to determining that the sibling pair is not with a serving site.

3. The method as recited in claim 2, wherein the adjacent site location method comprises determining both an angular sector relative to the adjacent cell and a range from the serving cell to the mobile device.

4. A method for use in locating a mobile device, comprising:
    causing the mobile device to receive beacon signals from a serving base transceiver station (BTS) and one or more adjacent BTSs, wherein each BTS is located at a cell site and each beacon signal includes cell identification (CID) information;
    detecting a number of sibling pairs based on the received beacon signals, wherein a sibling pair comprises two downlink transmission antennae that are co-sited sectors of a multi-sector cell site; and selecting a predefined location method based on the number of sibling pairs detected;
wherein the number of sibling pairs detected is greater than one, and in response thereto one of either a power angle-of-arrival (AoA) location method or a power AoA with ranging location method is selected.

5. The method as recited in claim 4, wherein the power AoA with ranging location method is selected in response to determining that at least one sibling pair is with a serving site.

6. The method as recited in claim 4, wherein the power AoA location method is selected in response to determining that serving site ranging is not available.

7. The method as recited in claim 4, wherein the AoA location method or power AoA with ranging location method comprises a probabilistic method for geolocation of mobile devices using sibling pairs.

8. The method as recited in 7, wherein timing (Timing Advance (TA) in GSM) information and power information from the wireless network are derived by creating a model of the timing advance and power difference between siblings of neighbor cells over the range band.

9. The method as recited in claim 7, further comprising:
radially subdividing the joint area of the serving sector and range band into two or more divisions based on the cell size; and
for each radial, determining 1-to-n pixels to generate uniform coverage within the range band.

10. The method as recited in claim 9, further comprising:
for each sibling pair, determining a measured azimuth using normalized reported downlink power;
for each pixel, determining a theoretical azimuth using the pixel location, previously determined antenna characteristics, and the normalized reported downlink power; and
determining, for each pixel, the difference between respective measured azimuths and theoretical azimuths for each adjacent pair.

11. The method as recited in claim 10, further comprising:
using the differences to weight each pixel's location, wherein pixels with lower differences are assigned a higher weight; and
determining a final location estimate as the weighted average of the pixels with the smallest differences.

12. The method as recited in claim 11, wherein said determining a final location estimate comprises sorting pixel weights in descending order, selecting a predetermined number of the highest weights, and calculating as the final location estimate the weighted sum of the pixel locations associated with the selected highest weights.

13. A system configured to locate a mobile device, the system comprising at least one processor and at least one storage medium communicatively coupled to said at least one processor, the storage medium having stored therein computer-executable instructions for instructing the processor in causing the following steps:
causing the mobile device to receive beacon signals from a serving base transceiver station (BTS) and one or more adjacent BTSs, wherein each BTS is located at a cell site and each beacon signal includes cell identification (CID) information;
detecting a number of sibling pairs based on the received beacon signals, wherein a sibling pair comprises two downlink transmission antennae that are co-sited sectors of a multi-sector cell site; and
selecting a predefined location method based on the number of sibling pairs detected;
wherein the number of sibling pairs detected is zero, and in response thereto a power-difference-of-arrival with ranging (PDOA) location method is selected.

14. A system configured to locate a mobile device, the system comprising at least one processor and at least one storage medium communicatively coupled to said at least one processor, the storage medium having stored therein computer-executable instructions for instructing the processor in causing the following steps:
causing the mobile device to receive beacon signals from a serving base transceiver station (BTS) and one or more adjacent BTSs, wherein each BTS is located at a cell site and each beacon signal includes cell identification (CID) information;
detecting a number of sibling pairs based on the received beacon signals, wherein a sibling pair comprises two downlink transmission antennae that are co-sited sectors of a multi-sector cell site; and
selecting a predefined location method based on the number of sibling pairs detected;
wherein the number of sibling pairs detected is one, and an adjacent site location method is selected; and
wherein the adjacent site location method is selected in response to determining that the sibling pair is not with a serving site.

15. The system as recited in claim 14, wherein the adjacent site location method comprises determining both an angular sector relative to the adjacent cell and a range from the serving cell to the mobile device.

16. A system configured to locate a mobile device, the system comprising at least one processor and at least one storage medium communicatively coupled to said at least one processor, the storage medium having stored therein computer-executable instructions for instructing the processor in causing the following steps:
causing the mobile device to receive beacon signals from a serving base transceiver station (BTS) and one or more adjacent BTSs, wherein each BTS is located at a cell site and each beacon signal includes cell identification (CID) information;
detecting a number of sibling pairs based on the received beacon signals, wherein a sibling pair comprises two downlink transmission antennae that are co-sited sectors of a multi-sector cell site; and
selecting a predefined location method based on the number of sibling pairs detected;
wherein the number of sibling pairs detected is greater than one, and in response thereto one of either a power angle-of-arrival (AoA) location method or a power AoA with ranging location method is selected.

17. The system as recited in claim 16, wherein the power AoA with ranging location method is selected in response to determining that at least one sibling pair is with a serving site.

18. The system as recited in claim 16, wherein the power AoA location method is selected in response to determining that serving site ranging is not available.

19. The system as recited in claim 16, wherein the AoA location method or power AoA with ranging location method comprises a probabilistic method for geolocation of mobile devices using sibling pairs.

20. The system as recited in 19, wherein timing (Timing Advance (TA) in GSM) information and power information from the wireless network are derived by creating a model of the timing advance and power difference between siblings of neighbor cells over the range band.

21. The system as recited in claim 19, further comprising:
radially subdividing the joint area of the serving sector and range band into two or more divisions based on the cell size; and
for each radial, determining 1-to-n pixels to generate uniform coverage within the range band.

22. The system as recited in claim 21, further comprising:
for each sibling pair, determining a measured azimuth using normalized reported downlink power;
for each pixel, determining a theoretical azimuth using the pixel location, previously determined antenna characteristics, and the normalized reported downlink power; and
determining, for each pixel, the difference between respective measured azimuths and theoretical azimuths for each adjacent pair.

23. The system as recited in claim 22, further comprising:
using the differences to weight each pixel's location, wherein pixels with lower differences are assigned a higher weight; and
determining a final location estimate as the weighted average of the pixels with the smallest differences.

24. The system as recited in claim 23, wherein said determining a final location estimate comprises sorting pixel weights in descending order, selecting a predetermined number of the highest weights, and calculating as the final location estimate the weighted sum of the pixel locations associated with the selected highest weights.

25. A tangible computer readable storage medium storing thereon computer executable instructions for locating a mobile device, said computer executable instructions comprising:
instructions for causing the mobile device to receive beacon signals from a serving base transceiver station (BTS) and one or more adjacent BTSs, wherein each BTS is located at a cell site and each beacon signal includes cell identification (CID) information;
instructions for detecting a number of sibling pairs based on the received beacon signals, wherein a sibling pair comprises two downlink transmission antennae that are co-sited sectors of a multi-sector cell site; and
instructions for selecting a predefined location method based on the number of sibling pairs detected;
wherein the number of sibling pairs detected is zero, and in response thereto a power-difference-of-arrival with ranging (PDOA) location method is selected.

26. A tangible computer readable storage medium storing thereon computer executable instructions for locating a mobile device, said computer executable instructions comprising:
instructions for causing the mobile device to receive beacon signals from a serving base transceiver station (BTS) and one or more adjacent BTSs, wherein each BTS is located at a cell site and each beacon signal includes cell identification (CID) information;
instructions for detecting a number of sibling pairs based on the received beacon signals, wherein a sibling pair comprises two downlink transmission antennae that are co-sited sectors of a multi-sector cell site; and
instructions for selecting a predefined location method based on the number of sibling pairs detected;
wherein the number of sibling pairs detected is one, and an adjacent site location method is selected; and
wherein the adjacent site location method is selected in response to determining that the sibling pair is not with a serving site.

27. The computer readable storage medium as recited in claim 26, wherein the adjacent site location method comprises determining both an angular sector relative to the adjacent cell and a range from the serving cell to the mobile device.

28. A tangible computer readable storage medium storing thereon computer executable instructions for locating a mobile device, said computer executable instructions comprising:
instructions for causing the mobile device to receive beacon signals from a serving base transceiver station (BTS) and one or more adjacent BTSs, wherein each BTS is located at a cell site and each beacon signal includes cell identification (CID) information;
instructions for detecting a number of sibling pairs based on the received beacon signals, wherein a sibling pair comprises two downlink transmission antennae that are co-sited sectors of a multi-sector cell site; and
instructions for selecting a predefined location method based on the number of sibling pairs detected;
wherein the number of sibling pairs detected is greater than one, and in response thereto one of either a power angle-of-arrival (AoA) location method or a power AoA with ranging location method is selected.

29. The computer readable storage medium as recited in claim 28, wherein the power AoA with ranging location method is selected in response to determining that at least one sibling pair is with a serving site.

30. The computer readable storage medium as recited in claim 28, wherein the power AoA location method is selected in response to determining that serving site ranging is not available.

31. The computer readable storage medium as recited in claim 28, wherein the AoA location method or power AoA with ranging location method comprises a probabilistic method for geolocation of mobile devices using sibling pairs.

32. The computer readable storage medium as recited in 31, wherein timing (Timing Advance (TA) in GSM) information and power information from the wireless network are derived by creating a model of the timing advance and power difference between siblings of neighbor cells over the range band.

33. The computer readable storage medium as recited in claim 31, further comprising:
instructions for radially subdividing the joint area of the serving sector and range band into two or more divisions based on the cell size; and
instructions for, for each radial, determining 1-to-n pixels to generate uniform coverage within the range band.

34. The computer readable storage medium as recited in claim 33, further comprising:
instructions for, for each sibling pair, determining a measured azimuth using normalized reported downlink power;
instructions for, for each pixel, determining a theoretical azimuth using the pixel location, previously determined antenna characteristics, and the normalized reported downlink power; and
instructions for determining, for each pixel, the difference between respective measured azimuths and theoretical azimuths for each adjacent pair.

35. The computer readable storage medium as recited in claim 34, further comprising:
instructions for using the differences to weight each pixel's location, wherein pixels with lower differences are assigned a higher weight; and
instructions for determining a final location estimate as the weighted average of the pixels with the smallest differences.

36. The computer readable storage medium as recited in claim 35, wherein said instructions for determining a final location estimate comprise instructions for sorting pixel weights in descending order, instructions for selecting a predetermined number of the highest weights, and instructions for calculating as the final location estimate the weighted sum of the pixel locations associated with the selected highest weights.

37. A mobile device configured to detect location measurements, the mobile device comprising:
  means for receiving beacon signals from a serving base transceiver station (BTS) and one or more adjacent BTSs, wherein each BTS is located at a cell site and each beacon signal includes cell identification (CID) information;
  means for detecting a number of sibling pairs based on the received beacon signals, wherein a sibling pair comprises two downlink transmission antennae that are co-sited sectors of a multi-sector cell site;
  means for selecting a predefined location method based on the number of sibling pairs detected; and
  means for selecting a power-difference-of-arrival with ranging (PDOA) location method when the number of sibling pairs detected is zero.

38. A mobile device configured to detect location measurements, the mobile device comprising:
  means for receiving beacon signals from a serving base transceiver station (BTS) and one or more adjacent BTSs, wherein each BTS is located at a cell site and each beacon signal includes cell identification (CID) information;
  means for detecting a number of sibling pairs based on the received beacon signals, wherein a sibling pair comprises two downlink transmission antennae that are co-sited sectors of a multi-sector cell site;
  means for selecting one of either a single site location method or an adjacent site location method when the number of sibling pairs detected is one and
  means for selecting the adjacent site location method when the sibling pair is not with a serving site.

39. The mobile device as recited in claim 38, wherein the adjacent site location method comprises determining both an angular sector relative to the adjacent cell and a range from the serving cell to the mobile device.

40. A mobile device configured to detect location measurements, the mobile device comprising:
  means for receiving beacon signals from a serving base transceiver station (BTS) and one or more adjacent BTSs, wherein each BTS is located at a cell site and each beacon signal includes cell identification (CID) information;
  means for detecting a number of sibling pairs based on the received beacon signals, wherein a sibling pair comprises two downlink transmission antennae that are co-sited sectors of a multi-sector cell site; and
  means for selecting one of either a power angle-of-arrival (AoA) location method or a power AoA with ranging location method when the number of sibling pairs detected is greater than one.

41. The mobile device as recited in claim 40, further comprising means for selecting the power AoA with ranging location method when at least one sibling pair is with a serving site.

42. The mobile device as recited in claim 40, further comprising means for selecting the power AoA location method when serving site ranging is not available.

43. The mobile device as recited in claim 40, wherein the AoA location method or power AoA with ranging location method comprises a probabilistic method for geolocation of the mobile device using sibling pairs.

44. The mobile device as recited in 43, wherein timing (Timing Advance (TA) in GSM) information and power information from the wireless network are derived by using a model of the timing advance and power difference between siblings of neighbor cells over the range band.

45. The mobile device as recited in claim 43, further comprising:
  means for radially subdividing the joint area of the serving sector and range band into two or more divisions based on the cell size; and
  means for, for each radial, determining 1-to-n pixels to generate uniform coverage within the range band.

46. The mobile device as recited in claim 45, further comprising:
  means for, for each sibling pair, determining a measured azimuth using normalized reported downlink power;
  means for, for each pixel, determining a theoretical azimuth using the pixel location, previously determined antenna characteristics, and the normalized reported downlink power; and
  means for determining, for each pixel, the difference between respective measured azimuths and theoretical azimuths for each adjacent pair.

47. The mobile device as recited in claim 46, further comprising:
  means for using the differences to weight each pixel's location, wherein pixels with lower differences are assigned a higher weight; and
  means for determining a final location estimate as the weighted average of the pixels with the smallest differences.

48. The mobile device as recited in claim 47, wherein said means for determining a final location estimate comprise means for sorting pixel weights in descending order, means for selecting a predetermined number of the highest weights, and means for calculating as the final location estimate the weighted sum of the pixel locations associated with the selected highest weights.

49. A location server for use in locating a mobile device, the location server comprising at least one processor and at least one storage medium communicatively coupled to said at least one processor, the storage medium having stored therein computer-executable instructions for instructing the processor in causing the following steps:
  detecting a number of sibling pairs based on beacon signal information received from the mobile device based on beacon signals from a serving base transceiver station (BTS) and one or more adjacent BTSs, wherein each BTS is located at a cell site and each beacon signal includes cell identification (CID) information, wherein a sibling pair comprises two downlink transmission antennae that are co-sited sectors of a multi-sector cell site; and
  selecting a predefined location method based on the number of sibling pairs detected;
  wherein the number of sibling pairs detected is zero, and in response thereto a power-difference-of-arrival with ranging (PDOA) location method is selected.

50. A location server for use in locating a mobile device, the location server comprising at least one processor and at least one storage medium communicatively coupled to said at least one processor, the storage medium having stored therein computer-executable instructions for instructing the processor in causing the following steps:
  detecting a number of sibling pairs based on beacon signal information received from the mobile device based on beacon signals from a serving base transceiver station (BTS) and one or more adjacent BTSs, wherein each BTS is located at a cell site and each beacon signal includes cell identification (CID) information, wherein a sibling pair comprises two downlink transmission antennae that are co-sited sectors of a multi-sector cell site; and
  selecting a predefined location method based on the number of sibling pairs detected;
  wherein the number of sibling pairs detected is one and an adjacent site location method is selected in response to determining that the sibling pair is not with a serving site.

51. The location server as recited in claim 50, wherein the adjacent site location method comprises determining both an angular sector relative to the adjacent cell and a range from the serving cell to the mobile device.

52. A location server for use in locating a mobile device, the location server comprising at least one processor and at least one storage medium communicatively coupled to said at least one processor, the storage medium having stored therein computer-executable instructions for instructing the processor in causing the following steps:
  detecting a number of sibling pairs based on beacon signal information received from the mobile device based on beacon signals from a serving base transceiver station (BTS) and one or more adjacent BTSs, wherein each BTS is located at a cell site and each beacon signal includes cell identification (CID) information, wherein a sibling pair comprises two downlink transmission antennae that are co-sited sectors of a multi-sector cell site; and
  selecting a predefined location method based on the number of sibling pairs detected;
  wherein the number of sibling pairs detected is greater than one, and in response thereto one of either a power angle-of-arrival (AoA) location method or a power AoA with ranging location method is selected.

53. The location server as recited in claim 52, wherein the power AoA with ranging location method is selected in response to determining that at least one sibling pair is with a serving site.

54. The location server as recited in claim 52, wherein the power AoA location method is selected in response to determining that serving site ranging is not available.

55. The location server as recited in claim 52, wherein the AoA location method or power AoA with ranging location method comprises a probabilistic method for geolocation of mobile devices using sibling pairs.

56. The location server as recited in claim 52, wherein timing (Timing Advance (TA) in GSM) information and power information from the wireless network are derived by creating a model of the timing advance and power difference between siblings of neighbor cells over the range band.

57. The location server as recited in claim 55, further comprising the following steps:
  radially subdividing the joint area of the serving sector and range band into two or more divisions based on the cell size; and
  for each radial, determining 1-to-n pixels to generate uniform coverage within the range band.

58. The location server as recited in claim 57, further comprising the following steps:
  for each sibling pair, determining a measured azimuth using normalized reported downlink power;
  for each pixel, determining a theoretical azimuth using the pixel location, previously determined antenna characteristics, and the normalized reported downlink power; and
  determining, for each pixel, the difference between respective measured azimuths and theoretical azimuths for each adjacent pair.

59. The location server as recited in claim 58, further comprising the following steps:
  using the differences to weight each pixel's location, wherein pixels with lower differences are assigned a higher weight; and
  determining a final location estimate as the weighted average of the pixels with the smallest differences.

60. The location server as recited in claim 59, wherein said determining a final location estimate comprises sorting pixel weights in descending order, selecting a predetermined number of the highest weights, and calculating as the final location estimate the weighted sum of the pixel locations associated with the selected highest weights.

* * * * *

UNITED STATES PATENT AND TRADEMARK OFFICE
CERTIFICATE OF CORRECTION

| | |
|---|---|
| PATENT NO. | : 8,315,647 B2 |
| APPLICATION NO. | : 12/980116 |
| DATED | : November 20, 2012 |
| INVENTOR(S) | : Pitchaiah Soma et al. |

It is certified that error appears in the above-identified patent and that said Letters Patent is hereby corrected as shown below:

<u>Title Page</u>

Item [75] Inventors

Delete "Pitchaiah Soma, Downington, PA (US)" and insert
--Pitchaiah Soma, Downington, PA (IN)-- therefor.

Signed and Sealed this
Eighth Day of September, 2015

Michelle K. Lee
*Director of the United States Patent and Trademark Office*